United States Patent [19]
Floch et al.

[11] Patent Number: 5,639,517
[45] Date of Patent: Jun. 17, 1997

[54] PROCESS FOR THE PRODUCTION OF THIN FILMS HAVING OPTICAL PROPERTIES

[75] Inventors: Hervé Floch, Brunoy; Philippe Belleville, Courbevoie, both of France

[73] Assignee: Commissariat a l'Energie Atomique, France

[21] Appl. No.: 367,172

[22] PCT Filed: Jul. 8, 1993

[86] PCT No.: PCT/FR93/00707

§ 371 Date: Jan. 9, 1995

§ 102(e) Date: Jan. 9, 1995

[87] PCT Pub. No.: WO94/01598

PCT Pub. Date: Jan. 20, 1994

[30] Foreign Application Priority Data

Jul. 9, 1992 [FR] France .................. 92 08524

[51] Int. Cl.⁶ ........................................ B05D 1/28
[52] U.S. Cl. .................. 427/128; 427/226; 427/299; 427/429
[58] Field of Search ........................ 427/429, 428, 427/299, 226

[56] References Cited

U.S. PATENT DOCUMENTS

| | | | |
|---|---|---|---|
| 3,756,196 | 9/1973 | Furuuchi et al. | 118/401 |
| 4,370,356 | 1/1983 | Bok et al. | 427/429 |
| 4,966,812 | 10/1990 | Ashley et al. | 427/464 |
| 5,260,094 | 11/1993 | Giannelis et al. | 427/79 |

FOREIGN PATENT DOCUMENTS

| | | |
|---|---|---|
| 0414001 | 2/1991 | European Pat. Off. . |
| 3939501 | 6/1991 | Germany . |
| 2098510 | 11/1982 | United Kingdom . |

*Primary Examiner*—Shrive Beck
*Assistant Examiner*—David M. Maiorana
*Attorney, Agent, or Firm*—Hayes, Soloway, Hennessey, Grossman & Hage, P.C.

[57] ABSTRACT

A method is provided for fabricating thin films having various optical properties is provided. The disclosed method includes preparing a colloidal suspension and depositing the suspension on a substrate using a coating cylinder. The disclosed method finds particular utility in the area of manufacturing dielectric mirrors and non-reflecting films.

17 Claims, 1 Drawing Sheet

PROCESS FOR THE PRODUCTION OF THIN FILMS HAVING OPTICAL PROPERTIES

BACKGROUND OF THE INVENTION

1. Field of the Invention

The present invention relates to a process for the production of thin films having optical properties.

This process makes it possible to produce thin films having e.g. antireflection, hydrophobic or abrasion resistance properties. These thin films can also have the properties of a dielectric mirror, which reflects one or more specific wavelengths, whilst having a relatively low intrinsic absorption.

2. Description of the Prior Art

The thin films relate to an organic or inorganic substrate (particularly plastics or vitreous substrates), coated with a layer having the sought optical properties. These thin films have numerous applications, particularly in the following fields: high power lasers, solar, thermal and photovoltaic applications, integrated optical systems or in architectural applications such as external glazed panels. In the field of solar applications, said films are used in optical systems for minimizing heat losses, concentrating and focusing light energy and finally protecting certain absorbent elements. The great interest awakened by such thin films with optical properties has resulted in the development of various manufacturing processes. Apart from methods making it possible to deposit optical films on various substrates, namely vacuum evaporation, reactive plasma and fluorination processes, which are costly and lead to heat treatments at high temperatures, the prior art discloses chemical processes such as sol-gel deposition processes. This type of process makes it possible to produce films placed on substrates and having various optical properties without requiring a thermal stage at high temperatures.

Among the sol-gel deposition processes, one of these methods consists of preparing colloidal treatment solutions and the deposition thereof on a substrate. In other words this method consists of forming a stable homogeneous suspension of solid particles (colloids) in a liquid solvent, said suspension constituting what is called a "sol" and then allowing said solvent to evaporate. For producing thin films, the solvent used must be sufficiently volatile to evaporate easily and provide space for a deposit of solid particles on the substrate. The prepared sol is generally deposited on the substrate by dip coating, spin coating, spray coating, slip casting or tape casting.

Examples of thin films obtained by the sol gel method are e.g. described in U.S. Pat. Nos. 4,929,278, 4,966,812, or U.S. Pat. Nos. 2,432,483 and 4,271,210.

Moreover, deposition processes for such colloidal coatings have also been described. Thus, an Article entitled "Colloidal Sol-Gel Optical Coatings" was published in the American Ceramic Society Bulletin, vol.69, no.7, pp. 1141–1143, 1990, and describes the possibility of depositing several films of colloidal materials by spin coating, in order to produce the optical components of a laser. This Article states that by using sol-gel colloidal suspensions and by appropriately choosing the volatile solvents constituting the liquid phase of the colloidal medium, it is possible to carry out treatments at ambient temperature without excessive heating of the substrate.

However, the spin coating deposition process suffers from a certain number of disadvantages. For example, the size of the substrates is limited to small dimensions and the corners of square or rectangular substrates are not correctly coated with a uniform film of the substance which it is wished to deposit there.

The other deposition processes also suffer from a certain number of disadvantages.

Dip coating requires the preparation of large quantities of solution for immersing the substrate to be treated. This is not very advantageous in the case of multilayer coatings for large-size optics. The conventional vacuum deposition methods (PVD, CVD) makes it possible to obtain high quality deposits, but for this purpose involve a difficult and expensive procedure (use of a vaporization bell).

In addition, German patent application DE 39 39 501 discloses a laminar coating device making it possible to make deposits of films on planar substrates. It is thus possible to produce photographic coatings, as well as electronic coatings (flat screens).

Finally, U.S. Pat. No. 4,370,356 discloses a deposition process using a hollow cylinder or roll filled with the substance to be deposited and which is displaced in translation relative to a substrate, so as to deposit on the surface thereof a thin film of said substance. This process is more particularly intended for the deposition of photosensitive resins, lacquers, antireflection coatings or polyimides.

SUMMARY OF THE INVENTION

The present invention aims at obviating the disadvantages of the thin film production processes according to the prior art. To this end, the invention relates to a process for the production of thin films having optical properties.

According to the features of the invention, said process comprises the following stages:

preparing at least one colloidal suspension comprising colloids giving said optical properties, dispersed in a solvent, said colloidal suspension having a viscosity between 1 and 5 mPa.s, placing the substrate to be covered with the thin film on a support, introducing said colloidal suspension under pressure into a coating cylinder, displacing said cylinder in translation and at constant speed below the surface to be treated of the substrate, so that the colloidal suspension meniscus formed on the periphery of the coating cylinder ensures the deposition of a thin film of a colloidal nature on the surface of said substrate, also displacing in translation and following the passage of the coating cylinder, a mask parallel to the substrate surface plane, allowing the thus covered substrate to dry.

This process covers a wide range of applications in the field of coatings having optical properties, both as a result of its performance simplicity (ordinary temperatures and pressures) and its low cost. It in particular permits the deposition of thin films obtained by the colloidal sol-gel procedure, i.e. the deposition of colloidal suspensions having a very low viscosity. It also permits the coating of optical substrates of a planar nature or having a wide radius of curvature of various types (mineral or organic) or varied geometry (angular or circular).

This process also makes it possible to work on large surfaces which are not circular, whereas said limitation is imposed by a centrifugal treatment process. Moreover, this process also makes it possible to use a very small "sol" quantity for forming the thin film. This leads to a very advantageous final cost compared with conventional vaporization methods and also avoids significant pollution of the environment.

Finally, the use of a mask ensures that the surface of the substrate to be treated is not directly in contact with the ambient atmosphere once the thin film has been deposited. The surface of the substrate or rather the thin film is consequently protected immediately following deposition and for a few seconds afterwards. Drying is homogenized because the solvent vapors are sufficiently confined between the mask and the substrate. The deposit made is also clean, the drying speed is controlled and air turbulence around the deposit is avoided.

Advantageously, the displacement speed of the coating cylinder or roll is between approximately 1 and 10 mm per second.

The thickness of the thin film obtained is directly proportional to the coating speed, so that said speed range makes it possible to obtain the deposition of very thin colloidal films.

Preferably, use is made of means for breaking the meniscus at the end of the deposition of the thin film on the substrate. This makes it possible to finish the edge of the substrate without leading to significant overthickness effects.

According to an embodiment of the invention, the production process is carried out by alternately using a first colloidal suspension comprising colloids chosen from among silicon oxide, calcium fluoride or magnesium fluoride and dispersed in a solvent and a second colloidal suspension comprising colloids chosen from among aluminium oxide, titanium oxide, zirconium oxide, hafnium oxide, thorium oxide, tantalum oxide, niobium oxide, yttrium oxide, scandium oxide or lanthanum oxide and dispersed in a solvent. In this way it is possible to produce dielectric mirrors.

The invention will be better understood from reading the following description of a preferred, illustrative and non-limiting embodiment of the invention, with reference to the attached drawings, wherein:

DETAILED DESCRIPTION OF THE PREFERRED EMBODIMENT

Figure 1A:
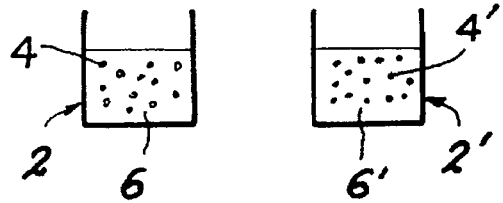
FIG. 1a depicts one stage of the thin film production process of one embodiment of the present invention.

As illustrated in FIG. 1a, the process according to the invention consists of firstly preparing at least one colloidal suspension 2 and optionally a second or third 2', comprising colloids 4, 4' giving the sought optical properties, said colloids being dispersed in a solvent 6, 6'. Certain preferred colloidal suspensions 2, 2' according to the invention will be described hereinafter. These colloidal suspensions 2, 2' generally have a viscosity between 1 and 5 mPa.s.

Figure 1B:
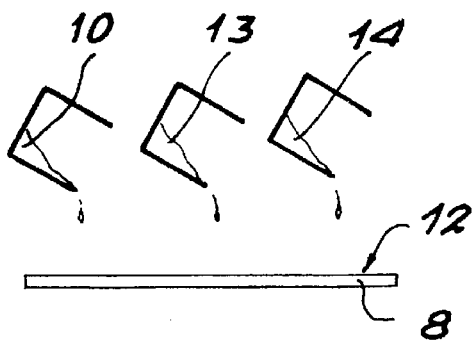
FIG. 1b depicts another stage of the aforesaid embodiment of the present invention.

As illustrated in FIG. 1b, the substrate 8 on which the deposition of the thin film is to take place firstly undergoes meticulous cleaning. This substrate can be either of an organic or an inorganic nature, as a function of the envisaged applications. An aqueous detergent solution 10 e.g. containing deionized water and Triton-X™ 100 (registered trademark) is firstly applied to the surface 12 to be treated of the substrate 8. This is followed by a rinsing, e.g. with the aid of deionized water 13 and then a second cleaning with ethanol 14, filtered to 0.2 micron.

When the substrate 8 is of an inorganic nature, the cleaning also includes a supplementary stage (not shown in FIG. 1b) consisting of exposing the substrate 8 to UV radiation in the presence of ozone. This leads to an increased hydrophilicity of the substrate surface 12 and consequently to a better wettability during deposition.

Figure 1C:
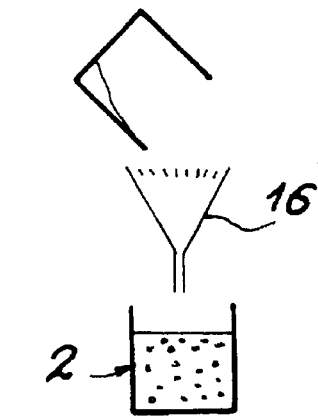
FIG. 1c depicts yet another stage of the aforesaid embodiment of the present invention.

As illustrated in FIG. 1c, prior to use, each colloidal suspension 2, 2' is filtered through a membrane 16 of glass fibers or Teflon (registered trademark) manufactured by E. I. Du Pont de Nemours and Co., Wilmington, Del., USA, as a function of the particular case.

Figure 1D:
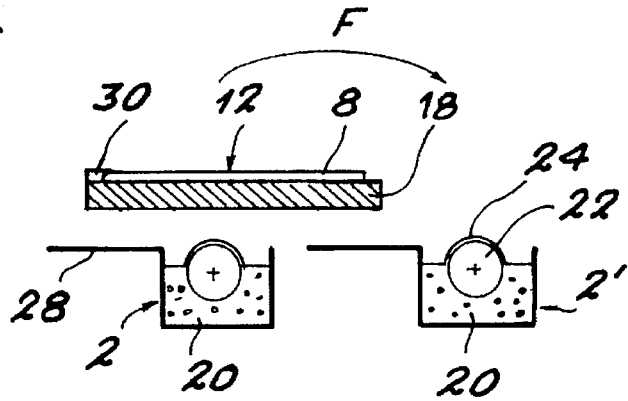
FIG. 1d depicts yet a further step of the aforesaid embodiment of the present invention.
Figure 1E:
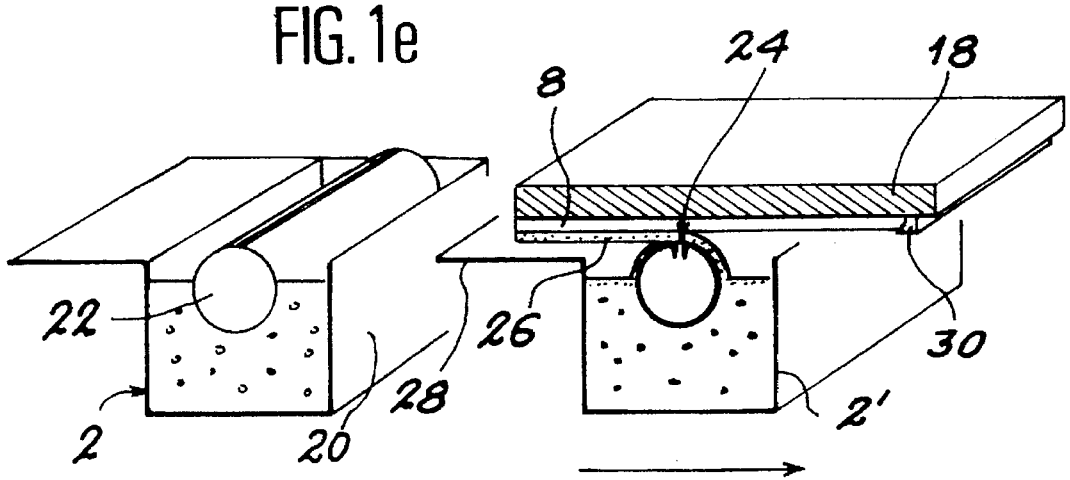
FIG. 1e depicts yet an additional step of the aforesaid embodiment of the present invention.

The coating deposition apparatus used here is diagrammatically illustrated in FIGS. 1d and 1e and is described in greater detail in the aforementioned DE 39 39 501. This apparatus comprises a support 18 on which is placed the substrate 8 and at least one tank 20 (preferably two or more tanks) for receiving the colloidal solutions 2, 2' and able to be displaced in translation along the substrate 8 by means of motor mechanisms, which are similar to those described in the aforementioned German document. Each of these tanks 20 incorporates a coating cylinder or roll 22. The motor mechanisms have been improved in such a way that the displacement of the coating cylinder 22 takes place at a uniform speed without jolting, in order to obtain an optimum homogeneous deposition.

After the colloidal suspensions 2, 2' have been filtered, they are introduced into not shown, fluid supply circuits of the laminar coating apparatus, so as to fill the tanks 20. This stage is illustrated in FIG. 1d. The tanks 20 have a capacity of approximately 0.4 liter. A continuous pumping system ensures the placing under pressure, the circulation and homogenization of the colloidal solution 2, 2'. The circuits are sufficiently hermetic to limit the evaporation of the solvents 6, 6' used during the treatment.

Then, the substrate to be covered is placed on the treatment support 18, so that its face 12 to be treated is directed upwards (cf. FIG. 1d). It is kept in contact with said support by suction with the aid of e.g. a primary vacuum pump. The assembly formed by the support 18 and the substrate 8 is then turned over manually (arrow F), so as to reverse the face 12 of the substrate, so that it is directed downwards with respect to FIG. 1d.

Deposition then takes place in the manner described hereinafter. As illustrated in FIG. 1e, the coating cylinder 22 is displaced in accordance with a uniform translation movement a few tenths of a millimeter below the face to be treated 12 of the substrate 8, the longitudinal axis of the cylinder 22 being perpendicular to the displacement performed. A colloidal suspension meniscus 24 formed on the periphery of the coating cylinder 22 and more specifically along one of its generatrixes ensures throughout its displacement the formation of the thin film 26 on the face 12 of the substrate 8.

The meniscus 24 can be created by a coating cylinder 22 of the microporous type having pore sizes of 10 microns or of the type having a longitudinal slit along one of its generatrixes.

The viscosity of the solutions used is generally 1 and 5 mPa.s. It should be noted that if the colloidal solution were too viscous, it might block the supply channels of the coating apparatus, whereas if it was too fluid, it might not attach itself correctly to the substrate 8.

With a view to controlling the evaporation of the solvent 6, 6' during the drying of the thin film 26, the tank 20 is provided with a mask 28 formed by a plate extending horizontally from one of its edges parallel to the support 18 and therefore to the substrate 8. When the cylinder 22 is displaced in translation, this also applies with respect to the mask 28. The dimensions of the mask 28 are equal to or greater than those of the substrate 8 so as to integrally cover the latter. This mask makes it possible to confine the vapors of the solvent 6, 6' and limit the absences of drying homogeneity. This also makes it possible to obtain a deposit with a regular thickness and therefore excellent, uniform optical properties. The regulation of the distance between the mask 28 and the thin film surface 26 is optimized in accordance with the volatility properties of the solvents 6, 6' used, the flow of air around the coating apparatus, the viscosity of the colloidal solution 2, 2' or its concentration.

Moreover, as illustrated in FIGS. 1d and 1e, the support 18 of the substrate 8 incorporates a knife 30, which makes it possible to break the meniscus 24 formed on the cylinder 22 at the end of the displacement of the latter, so as to avoid the appearance of significant edge effects at the thin film 26.

The translation speed of the coating cylinder 22 is controlled by the application of a precise voltage to the terminals of a direct current motor (not described and not shown in FIGS. 1d and 1e), but illustrated in DE 39 39 501. Thus, it is vital to have a constant speed in order to obtain a deposit with a regular thickness. In addition, the thickness of the film obtained is directly proportional to the coating speed. In the case of the colloidal suspensions used in the invention and described hereinafter, the cylinder translation speed is typically a few millimeters per second and more specifically approximately 1 to 10 mm/s. This translation speed of the cylinder 22 corresponds to a deposit of a thin film 26 having a thickness of a few hundred nanometers.

Finally, the homogeneity and cleanness of the deposit are intimately linked with the immediate environment of the coating apparatus. It is therefore necessary to use a clean room atmosphere (class 100, US standard) in order to guarantee satisfactory optical performance characteristics of the coatings obtained by the process according to the invention. Advantageously, around the coating apparatus is maintained a horizontal, clean air flow under laminar conditions.

Following the complete drying of the first film 26, the use of a second tank 20 filled with a colloidal solution different from the first solution makes it possible to produce multifilm deposits.

As a result of the production process according to the invention, it is possible to make antireflection deposits. In this case deposition takes place of a colloidal solution 2 formed by an alcoholic suspension of colloidal silica (particle diameter approx. 200 Å), whose stability is guaranteed by a catalyst such as ammonia. The silica mass concentration is a few percent based on the solvent proportion. The alkalinity of the medium is characterized by a pH of 10 and the viscosity by a value close to 1 mPa.s. In practice, the silica sol 2 is obtained by hydrolysis of an alkoxide-type precursor, such as e.g. tetra ethyl orthosilicate in a basic alcoholic medium. The aliphatic alcohol widely used as the solvent is e.g. ethanol. The substrate is of an organic (plastic) or mineral (glass) nature.

When the substrates are liable to be damaged by humid atmospheres such as the KDP crystals used in frequency conversion, it is preferable to deposit a silicone coating rather than a silica coating. The dense silicone film is produced from resins of a commercial nature (Owens Illinois Inc.), which are alkyl/arylalkoxy siloxanes solubilized in an alcoholic solvent and converted into a silicone polymer system by heat treatment at approximately 180° C. for about 10 hours.

In order to improve the abrasion resistance characteristics of the antireflection deposits, it is possible to expose the colloidal silica film to an alkaline atmosphere (e.g. ammoniacal vapors) for a few hours. This treatment sufficiently reinforces the cohesion of the colloids with respect to one another and authorizes a careful touching of the film, as well as wiping with the aid of an alcohol-impregnated cloth.

As a result of the production process according to the invention, it is e.g. also possible to produce a material having simultaneously antireflection, hydrophobic and abrasion resistance properties. To this end, the process according to the invention then consists of successively depositing on a substrate 8 of an organic or inorganic nature, firstly an adhesion promoting coating, then a colloidal antireflection coating, then a coupling agent coating and finally an anti-abrasive coating. The adhesion promoting coating is made from a material chosen from among silanes. The antireflection coating 2 is formed from silica colloids 4 coated in a siloxane binder. The coupling agent coating is formed from a material chosen from among silazanes and the anti-abrasive coating is obtained with the aid of a fluorine polymer.

As a result of the production process according to the invention, it is also possible to e.g. produce interference dielectric mirrors comprising a substrate covered with a dielectric film, which selectively reflects one or more desired wavelengths. These dielectric mirrors generally comprise an alternation of a colloidal suspension coating having a given refractive index and a second colloidal suspension coating having a refractive index higher than that of the first suspension. In this case, the substrate 8 used is of an organic or inorganic nature and is in particular siliceous, metallic or ceramic.

The first colloidal suspension 2 comprises colloids 4 chosen from among silicon oxide, calcium fluoride or magnesium fluoride and dispersed in a solvent 6 chosen from among saturated aliphatic alcohols of formula ROH in which R represents an alkyl having 1 to 4 carbon atoms.

The second colloidal suspension 2', whereof the refractive index exceeds that of the first suspension 2 comprises colloids 4' chosen from among aluminium oxide, titanium oxide, zirconium oxide, hafnium oxide, thorium oxide, tantalum oxide, niobium oxide, yttrium oxide, scandium oxide or lanthanum oxide and dispersed in a solvent 6' of the same nature as that described hereinbefore.

The colloidal suspensions 2, 2' used are obtained from ionic precursors (acid salts) purified by recrystallization or molecular precursors (alkoxides) purified by distillation.

Preferably, these sols are produced respectively according to the methods of Stober (J. Colloid Interface Sci., 26, pp.62–69, 1968) for $SiO_2$, Thomas (Appli. Opt. 26, 4688, 1987), for $TiO_2$, Clearfield (Inorg. Chem., 3, 146, 1964) for $ZrO_2$ and $HfO_2$, O'Connor (U.S. Pat. No. 3,256,204, 1966) for $ThO_2$, Yoldas (Am. Cer. Soc. Bull. 54, 289, 1975) for AlOOH, S. Parraud (MRS. Better Ceramics Through Chemistry, 1991) for $Ta_2O_5$ and $Nb_2O_5$ and finally Thomas (Apl. Opt., 27, 3356, 1988) for $CaF_2$ and $MgF_2$.

The ionic precursors are usually chosen from among chlorides, oxychlorides, perchlorates, nitrates, oxynitrates or acetates.

The molecular precursors are preferably chosen from among alkoxides of molar formula $M(OR)_n$, in which M represents a metal or an element of group III or IV, OR an alkoxy radical with 1 to 6 carbon atoms and n the valency of the metal. In the methods describes hereinbefore, the precursor is hydrolyzed or fluorinated and is then polymerized until a finished product is obtained, which is insoluble in the chosen solvent, nucleated and called a colloidal suspension.

In all the examples described hereinbefore, it is possible to treat the substrate 8 covered with at least one thin film 26 by alkaline vapors, in order to improve the mechanical resistance properties and the laser flux resistance of the thus deposited coatings.

As a result of the process according to the invention, it is possible to produce a certain number of substrates covered with different thin films. The following practical examples illustrate this.

EXAMPLE 1

The substrate 8 used is a glass substrate (white glass or flint B270) with a surface area of 200×200 mm² and a thickness of 6 mm. The polishing quality is 3λ (λ=1.06 micron) and the refractive index is 1.52 at a wavelength of 600 nm. This substrate 8 is cleaned according to the following procedure: cleaning the surface with a hydrofluoric acid solution diluted to 1 vol. %, then abundant rinsing with pure, deionized water, cleaning with a detergent, green soap solution (Eli Lilly & Co.), rinsing with pure water and then ethyl alcohol filtered to 0.2 micron.

1) A colloidal suspension 2 was prepared by mixing 1046.3 g of absolute ethanol with 136.7 g of distilled tetraethyl orthosilicate (167° C., $10^5$Pa). The mixture is homogenized by stirring for 9 minutes. This stirring is maintained, followed by the addition of 36.3 g of min. 28% ammonia. The hydrolysis reaction requires a minimum of 48 h at 25° C. in order to be complete. This leads to an opalescence indicating the formation of silica colloids. The grain size measurement performed reveals a mean diameter of the colloids of 21 ±9 nm. The final pH of said sol is approximately 10.5 and the mass concentration in $SiO_2$ is 3.2%. Prior to use the silica sol is filtered to 0.2 micron.

2) The first deposition circuit of the coating apparatus is filled with approximately 400 cm³ of silica sol 2. The deposition parameters are adjusted as follows: translation speed 5 mm/second, distance between the mask 28 and substrate 8 4 mm and drying time 2 minutes.

By spectrophotometry, the thus treated substrate 8 reveals the following transmission factors:

T=95.8% at 1100 nm (maximum)

T=95.6% at 1200 nm

T=95.4% at 1000 nm

These measurements are accurate to within ±0.3% in transmission and represent the complete treated antireflection treated surface.

The refractive index of the $SiO_2$ coating under these deposition conditions is 1.22 at 1060 nm, which corresponds to a porosity of approximately 50%.

EXAMPLE 2

The substrate 8 used is a glass substrate (white flint B270) of surface 200×200 mm² and thickness 6 mm. Polishing is of quality 3λ (λ=1.06 micron) and the refractive index is 1.52 for a wavelength of 600 nm. The cleaning procedure for the substrate involves the cleaning of the surface with a hydrofluoric acid solution diluted to 1 vol. %, rinsing with pure, deionized water, cleaning with a detergent, green soap solution, rinsing with pure, deionized water and then ethyl alcohol filtered to 0.2 micron.

1) A colloidal suspension 2 was prepared as in example 1.

2) The first deposition circuit of the coating apparatus is filled with approximately 400 cm³ of silica sol 2. Deposition takes place on the substrate 8 in accordance with the following procedure: translation speed 6.5 mm/second, distance between the mask 28 and substrate 8 4 mm and drying time 2 minutes.

3) The thus treated substrate is then placed under ammoniacal confinement in a sealed enclosure (volume 5 dm³) containing approximately 500 cm³ of min. 28% ammonium in its bottom. The substrate is kept in the presence of these alkaline vapors for a minimum of 10 h in order to obtain abrasion resistance qualities.

4) This is followed by the antireflection treatment of the other face of the substrate according to the same deposition parameters as in 2).

5) The substrate treated on both its faces is then again placed under ammoniacal confinement according to the process described in 3).

This treatment leads to the following properties. The optical transmission values are 99.8% at 1100 nm, 99.5% at 1200 nm and 99.4% at 1000 nm. These values are precise to within ±0.3% in transmission and are representative of the complete treated surface. There is an abrasion resistance of the deposited films allowing the surface to be wiped with an alcohol-impregnated blotting paper (known as drag wiping). The laser flux resistance values exceed 18 J/cm² with a pulse time of 3 ns, at a wavelength of approximately 1064 nm and exceeding 45 J/cm² with a pulse time of 8 ns and a wavelength of approximately 1064 nm.

EXAMPLE 3

The substrate 8 used is identical to that of example 1 and was prepared in the same way.

1) A colloidal suspension 2 was prepared as in examples 1 and 2.

2) Preparation also took place of a colloidal suspension 2' by vigorously hydrolyzing 246 g of sec. aluminium butoxide (1 mole) in 3000 g of deionized water (166 moles at 65° C.). This gave a whitish, voluminous precipitate of aluminium hydroxide. This was followed by the extraction of the isobutanol by distillation at 90° C., at atmospheric pressure ($10^5$Pa) and refluxing took place at 100° C. The precipitate was then peptized by adding 7.0 g of concentrated hydrochloric acid (0.07 mole) and a total reflux was maintained for approximately 15 hours. This gave a finely divided colloidal sol with an opalescent appearance containing aluminium hydroxide particles (boehmite type) of parallelepipedic morphology (4 nm×20 nm×5 nm). There is a monodispersed particle distribution. The aluminium hydroxide sol is concentrated in vacuo until reaching 12% $Al_2O_3$ (425 g). This gives a product in the form of a gelatinous paste which can be easily redispersed under ultrasonics in light aliphatic alcohols. Typically, this sol is refluidified by 3.5% $Al_2O_3$ dilution in pure methanol. The pH of the sol is brought from pH 3.5 to 5.5 by adding propylene oxide (epoxy-1,2-propane), which neutralizes the excess hydrochloric acid without losing the colloidal stability. The added propylene oxide proportion corresponds to a molar ratio (propylene oxide/HCl) of 1 in the mixture and pH equilibrium is only reached after stirring for several days. Prior to use, this sol is diluted to 2.5% with methanol and filtered on a fiberglass screen.

3) The two deposition circuits of the laminar coating apparatus are filled with respectively 400 cm$^3$ of sol 2 and 400 cm$^3$ of sol 2'. This is followed by the deposition of the silica coating (sol 2) according to the following parameters: translation speed 5 mm/second, distance between mask 28 and substrate 8 4 mm and drying time 2 minutes. On said SiO$_2$ deposit is then made the deposit of an aluminium hydroxide coating (sol 2') according to the following parameters: translation speed 700 mm/s, distance between the mask 28 and substrate 8 4 mm and drying time 2 minutes. This alternate deposit procedure is repeated until a mirror is obtained having 34 coatings in all, i.e. 17 SiO coatings alternating with 17 Al$_2$O$_3$.H$_2$O coatings. In order to limit the constraints of such a stack, the substrate is immersed in ammonia vapours for 10 minutes following the deposition of each SiO$_2$ coating. The spectral responses in reflection under normal incidence (0°) are 98.9 ±0.5% at a wavelength of 1060 nm and 98.1 ±0.7% at 350 nm. In this dielectric mirror which is free from cracks or pronounced edge effects, the SiO$_2$ and Al$_2$O$_3$.H$_2$O monocoatings have refractive indices respectively of 1.22 and 1.43 at 1060 nm, i.e. corresponding to respective porosities of 50 and 35%.

The optical thin films or coatings obtained comply with the quality criteria with respect to optical properties (transmission and reflection) with respect to the uniformity and planeity of the deposit and relative to the mechanical resistance and laser flux resistance properties.

We claim:

1. A process for coating of at least one thin film having optical properties, and comprising:

preparing at least one colloidal suspension comprising colloids giving said optical properties dispersed in a solvent, said colloidal suspension having a viscosity between 1 and 5 mPa.s, placing a substrate to be covered with the thin film on a support, introducing said colloidal suspension under pressure into a coating cylinder, displacing said cylinder in translation and at constant speed below a surface to be treated of the substrate, so that a meniscus of the colloidal suspension formed on a periphery of the coating cylinder permits deposition of a colloidal thin film on the surface of said substrate, also displacing in translation after passage of the coating cylinder below the surface of the substrate for depositing the thin film onto the substrate, a mask, parallel to the plane of the surface of the substrate, allowing the thus covered substrate to dry.

2. A process according to claim 1, wherein displacement speed of the coating cylinder is between approximately 1 and 10 mm per second.

3. A process according to claim 1, wherein the coating cylinder is provided with a longitudinal slit along one of its generatrixes.

4. A process according to claim 1, wherein the coating cylinder is a microporous cylinder.

5. A process according to claim 1, and further comprising breaking the meniscus at the end of the deposition of the thin film on the substrate.

6. A process according to claim 1, wherein prior to depositing the colloidal suspension, the substrate is cleaned with aid of an aqueous detergent solution or an ethanol solution.

7. A process according to claim 6, wherein the substrate is inorganic and following the cleaning of the substrate, the substrate is subjected to an ultraviolet ray treatment in presence of ozone.

8. A process according to claim 1, and also comprising depositing a colloidal suspension including colloids of silicon oxide dispersed in an aliphatic alcohol.

9. A process according to claim 8, wherein on the substrate is deposited a silicon coating before making the deposit of a thin film of said silicon oxide.

10. A process according to claim 1, and also including, successively depositing a first colloidal suspension comprising a colloid selected from the group consisting of silicon oxide, calcium fluoride and magnesium fluoride dispersed in a solvent and a second colloidal suspension comprising a colloid selected from the group consisting of aluminum oxide, titanium oxide, zirconium oxide, hafnium oxide, thorium oxide, tantalum oxide, niobium oxide, yttrium oxide, scandium oxide and lanthanum oxide dispersed in a solvent.

11. A process according to claim 10, wherein the solvent comprises a saturated aliphatic alcohol of the formula ROH, in which R represents an alkyl having 1 to 4 carbon atoms.

12. A process according to claim 1, and further comprising introducing into a coating cylinder (22) and then successively depositing by means of said cylinder an adhesion promoting coating formed from a material selected from the group consisting of a silane, an antireflection coating formed from a silica colloid coated with a siloxane binder, a coupling agent coating formed from a material selected from the group consisting of a silane and an antiabrasive coating of a fluorine polymer.

13. A process according to claim 8, wherein the deposited films are treated by alkaline vapors.

14. A process according to claim 9, wherein the deposited films are treated by alkaline vapors.

15. A process according to claim 10, wherein the deposited films are treated by alkaline vapors.

16. A process according to claim 11, wherein the deposited films are treated by alkaline vapors.

17. A process according to claim 12, wherein the deposited films are treated by alkaline vapors.

* * * * *